May 20, 1930.  N. MARSHALL  1,759,488
BEAD CHAIN
Filed July 9, 1927
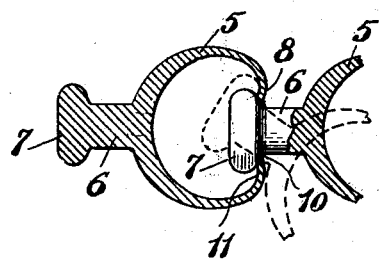
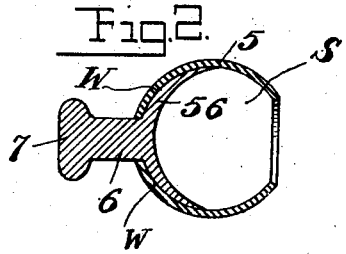
Inventor
Norman Marshall
By his Attorneys
Edwards + Henry Patented May 20, 1930

1,759,488

UNITED STATES PATENT OFFICE

NORMAN MARSHALL, OF BRIDGEPORT, CONNECTICUT

BEAD CHAIN

Application filed July 9, 1927. Serial No. 204,596.

This invention relates to bead chains, which, as is well known in the art, have many important uses. Among these uses, notably, especially when the ball or keeper elements of the chain are of dimensions transverse to the length of the chain rather considerably less than one inch, is the employment of the bead chain as a pull means for throwing electric switches, such as are contained, for instance, in sockets for electric bulbs, to open or close position. Bead chains for this use are commonly encountered approximately one-eighth of an inch in diameter. The at present preferred embodiment of the new bead chain of this invention, as illustratively shown in the accompanying drawing, may, for convenience, be assumed to represent bead chains of the diameter last mentioned.

The principal object of the invention is to provide a bead chain element for use in a bead chain made up of a plurality of like elements, said elements being so formed and shaped that the flexibility of the chain and at the same time the strength thereof, will be greater than heretofore for a chain of given diameter and weight of material, per given unit of length.

The advantages of the invention will become apparent from the following description of the exemplifying embodiment which I have shown in the accompanying drawing.

Fig. 1 of this drawing illustrates one of the elements of the chain in axial section, a partly completed adjoining element being coupled thereto. Such adjoining element is shown partially in side elevation and partially in axial section, while a possible amplitude of swing of said adjoining element, relative to the first element, is indicated in broken lines. Fig. 2 is a modification in which the shank and head thereon are separate from the cup member.

Each element includes a socket or cup 5, an integral shank 6 and an integral shank enlargement 7, here illustrated as more button-shaped than globular, although of course any suitable shape for such enlargement may be employed in carrying out the invention.

According to the invention, the shank enlargement 7 of one element is set in the cup 5 of the adjoining element, when the latter cup is shaped as shown in the case of the cup on the element to the right of Fig. 1 of the drawing, and then the coupling of the two elements is completed and made permanent by rolling over and forcing inwardly the free marginal portion of the cup 5 all around, preferably, to produce a differential curvature as indicated at 8 from the general curvature of the socket after the socket is first shaped, such first shaping of said socket being shown on the element to the right of the drawing.

Thus, surrounding the end opening 10 in each socket, through which protrudes the shank 6 of the next chain member, is an annular socket portion 11, transversely curved to present a concave curvature facing the ball, with the curvature last mentioned always arranged to withstand to the maximum extent any accidental deformation of the part of the socket adjacent to the opening 10, due to the pull thereagainst along the length of the shank 6 of the next member and applied then at the button against the socket.

The portion 11 is valuable also in permitting the button to be shaped to take fullest advantage of the high degree of flexibility incorporated by other features of the invention; permitting a degree of safe flexibility such as that indicated in broken lines in the drawing.

Referring now to Fig. 2. This illustrates an embodiment of a unit generally like that shown in Figure 1, and used for a bead-chain as herein described, and particularly those assembled by the typical rivet-machine hammer blow. I have discovered that the shifting of the metal masses, during the course of the operations as described in connection with Fig. 1, apparently, sets up a line or substantially hemi-spherical surface or "plane" of there-localized weakness within the body of the unit, as indicated in Fig. 2 at W. At any rate, whatever be the explanation, this line apparently always manifests its presence, by bringing about a parting between the elements 5, 6 and 56, every time the unit of Fig. 1, coupled to another and similar unit as shown in Fig. 2, is subjected to the hammer blow just referred to; such hammer blow, as above, being applied to shape the socket 5 as at 8 and 11 in Fig. 1. The result is that the chain finally may be made up of a plurality of dissimilar and relatively movable elements, rather than a chain made up of a plurality of substantially identical elements, such as the chain illustrated in Fig. 1. The chain, then, may be made up of alternate elements one of which is a "dumbbell" member and the next one of which is a separate hollow ball member. Said hollow ball member is that member marked S in Fig. 2. The dumbbell member is the other member shown in Fig. 2, including the shank 6 and the true dumbbell end 7, but with the opposite dumbbell end 56 substantially crescent-shape in cross section. Thus, apparently, the process may be modified at will, as by predetermining the thicknesses to be given the different wall portions of the socket 5 in making the unit of Fig. 1; either to make a bead-chain of the kind illustrated in Fig. 1, or of the kind just described in connection with Fig. 2.

Having described one embodiment of my invention, it is obvious that the same is not to be restricted thereto, but is broad enough to cover all structures coming within the scope of the annexed claims.

What I claim is:

1. A chain of the character described made up of a plurality of like elements; each such element comprising a shank, an enlargement near one end of the shank and a substantially globular hollow structure at the other end of the shank, said hollow structure having an opening at the end thereof opposite the shank; the shank-enlargement of one element being housed in the hollow structure of the next element, said hollow structure of the last-mentioned element, in the part thereof marginal to said opening, being bent back toward the shank-enlargement of the first-mentioned element as well as in toward the shank of said first-mentioned element.

2. A bead chain element comprising a shank, an enlargement near one end of the shank, and a cup at the other end of the shank, the rim-adjacent part of said cup all around such rim being bent in and back toward the bottom of the cup to provide such rim as a constricted opening located intermediate the top and bottom of the cup.

3. A chain comprising a plurality of connected elements, one element being of hollow globular form having an opening, the rim about said opening being bent in and back toward the inside of the element, and the next adjacent element comprising a shank having an enlarged end housed in the hollow element and engaging the bent back rim thereof.

In testimony whereof, I have hereunto set my hand this 8th day of July, 1927.

NORMAN MARSHALL.